May 9, 1967 B. L. FROST 3,318,167
TRI-SHAFT TRANSMISSION
Filed Dec. 23, 1964
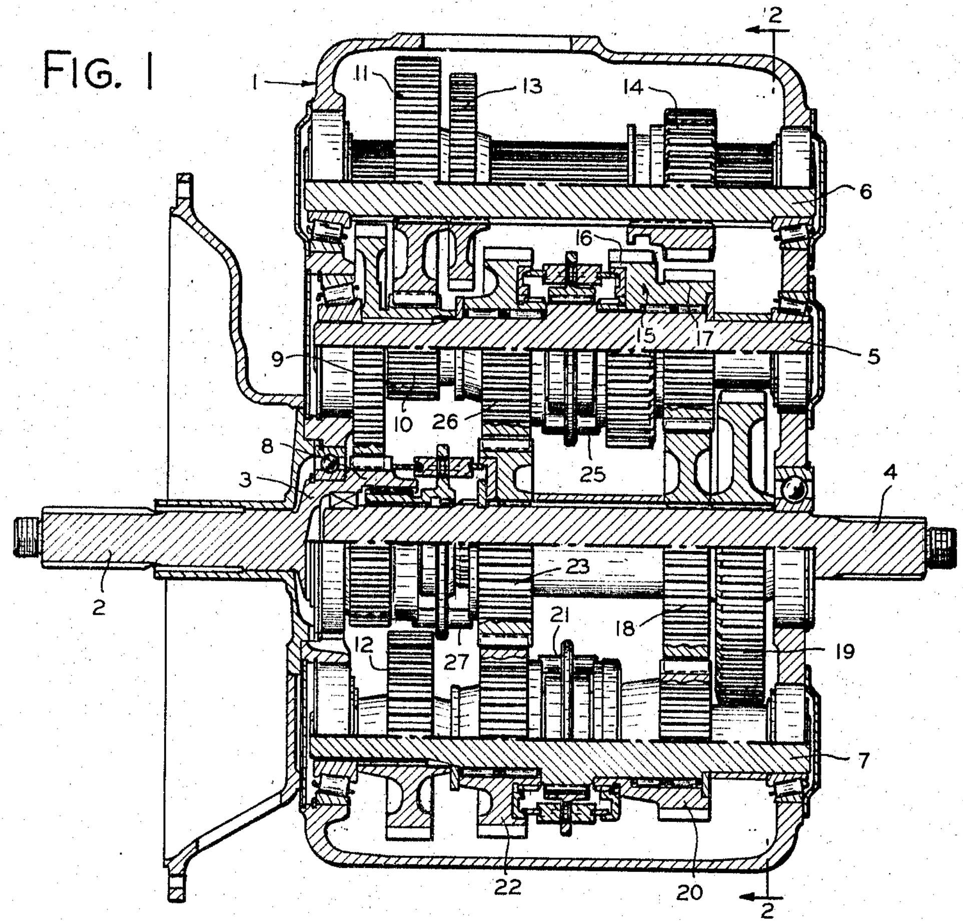
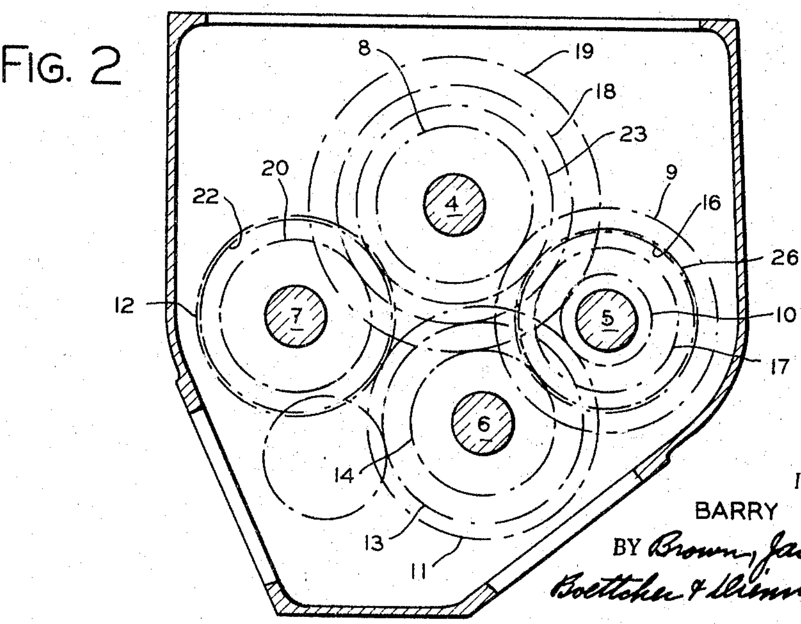
INVENTOR
BARRY L. FROST
BY Brown, Jackson, Boettcher & Dienner,
ATTORNEYS United States Patent Office 3,318,167
Patented May 9, 1967

3,318,167

TRI-SHAFT TRANSMISSION

Barry L. Frost, Jackson, Mich., assignor to Clark Equipment Company, a corporation of Michigan Filed Dec. 23, 1964, Ser. No. 420,506
6 Claims. (Cl. 74—331)

This invention relates to multiple speed transmission units for use in automotive vehicles and analogous purposes.

Transmission units of the character above referred to, broadly considered, are known and extensively used. My invention is directed to a transmission unit of compact construction comprising input and output shafts and associated countershafts with cooperating gearing so arranged that the desired speed of the output shaft may readily be attained from the input shaft through the countershafts and gearing. It is also an object of my invention to provide simplified means for obtaining first speed forward and reverse drive. Further objects and advantages of my invention will appear from the detailed description.

In the drawings:

FIGURE 1 is a plan view of a transmission unit embodying my invention with the housing open and certain parts shown partly in section and partly in plan; and FIGURE 2 is a sectional view taken substantially on line 2—2 of FIGURE 1.

The transmission unit of my invention comprises a suitable housing 1 in one end of which is rotatably mounted an input shaft 2 having at its inner end a tubular hub 3 of increased diameter. Hub 3 receives the inner end of an output shaft 4 coaxial with input shaft 2. Three countershafts 5, 6 and 7 are rotatably mounted in housing 1 in parallel spaced relation to the input and output shafts 2 and 4. All of the shafts so far mentioned are rotatably mounted and are restrained against endwise movement by antifriction bearing assemblies and associated parts of suitable known type, as shown, which need not be described in detail.

Hub 3 of input shaft 2 is provided with an exterior gear 8 integral therewith which meshes with gear 9 keyed on countershaft 5. A second gear 10, keyed on countershaft 5 meshes with a gear 11 keyed on countershaft 6 and the latter gear meshes with a gear 12 keyed on countershaft 7. It will be seen that all of the countershafts 5, 6 and 7 are driven from the input shaft 2. A power take-off gear 13 is also keyed on countershaft 6, adjacent gear 11 and need not be further considered here. A shiftable gear 14 is splined on shaft 6 for rotation therewith and adjustable lengthwise thereof. The gear 14 is shown in its neutral position in FIGURE 1 and may be shifted by suitable known means for either forward or reverse drive. For first speed forward gear 14 is shifted toward the left into mesh with a gear 16 of a gear unit 15, comprising gear 16 and a pinion 17 of reduced diameter, rotatably mounted on countershaft 5, conveniently by antifriction bearings of suitable known type as shown. The unit 15 is then driven from countershaft 6 and drives the output shaft 4 through pinion 17 which meshes with a gear 18 keyed on shaft 4. For reverse drive gear 14 is shifted to the right into mesh with a gear 19 keyed on output shaft 4. It will be seen that the output shaft 4 may be driven either in reverse or in first forward speed by shifting the gear 14 to proper extent in appropriate direction.

The gear 18 meshes with a gear 20 rotatably mounted on countershaft 7 by bearing means of suitable known type, as shown. A synchronizer clutch assembly 21 is splined on countershaft 7 between gear 20 and a second gear 22 rotatably mounted on countershaft 7 in the same manner as gear 20. In order to obtain second speed drive the clutch assembly 21 is shifted to the right thereby clutching gear 20 to countershaft 7 which then drives the output shaft 4 through gear 18. Shifting of the clutch assembly 21 to the left clutches gear 22 to countershaft 7 which then is effective for driving output shaft 4 at third speed through a gear 23 keyed on shaft 4 and meshing with gear 22.

A synchronizer clutch assembly 25, similar to the assembly 21, is splined on shaft 5 between the gear unit 15 and a gear 26 rotatably mounted on shaft 5 in the same manner as gears 20 and 22 are mounted on countershaft 7. The gear 26 meshes with gear 23. Shifting of clutch assembly 25 to the right is effective for clutching gear unit 15 to shaft 5, pinion 17 of such unit then being effective for driving the output shaft 4, through gear 18, in forward direction at fourth speed. Shifting of the clutch assembly to the left is effective for clutching gear 26 to countershaft 5 which then drives output shaft 4 at fifth speed forward, through the gear 23. A synchronizer clutch assembly 27, similar to assembly 25, is splined in hub 3 of input shaft 2 and slidable on output shaft 4 between gear 23 and hub 3 of input shaft 2. Shifting of the clutch assembly 27 to the right is effective for clutching hub 3 of the input shaft 2 directly to the output shaft 4, the latter being then driven at sixth forward speed.

It will be seen that the transmission unit of my invention provides compact and highly efficient means for driving the output shaft from the input shaft in forward direction at any one of a plurality of desired speeds, while also providing simple and highly efficient means for driving the output shaft in forward direction at first speed or in reverse, as desired.

It will be understood that changes in detail may be resorted to without departing from the field and scope of my invention, and I intend to include all such variations, as fall within the scope of the appended claims, in this application in which the preferred form only of my invention has been disclosed.

I claim:

1. In a transmission unit, an input shaft, an output shaft, a first gear secured on said input shaft, a first counter shaft, a second gear secured on said first counter shaft and meshing with said first gear, a third gear secured on said first counter shaft, a second counter shaft, a fourth gear secured on said second counter shaft and meshing with said third gear, a third counter shaft, a fifth gear secured on said third counter shaft and meshing with said fourth gear, and means for selectively establishing and disestablishing driving connection between said counter shafts and said output shaft.

2. In a transmission unit, an input shaft having at one end a tubular member, an output shaft coaxial with said input shaft and extending into said tubular member, a first gear secured on said tubular member, a first counter shaft, a second gear secured on said first counter shaft and meshing with said first gear, a third gear secured on said first counter shaft, a second counter shaft, a fourth gear secured on said second counter shaft and meshing with said third gear, a third counter shaft, a fifth gear secured on said third counter shaft and meshing with said fourth gear, means for selectively establishing and disestablishing driving connection between said counter shafts and said output shaft, and means for optionally establishing and disestablishing direct driving connection between said tubular member of said input shaft and said output shaft.

3. In a transmission unit, an input shaft, an output shaft coaxial with said input shaft, first and second and third counter shafts parallel with and spaced radially from said output shaft, means providing a constant drive between said input shaft and all of said counter shafts, a first gear keyed on said output shaft, a second gear keyed on said output shaft adjacent said first gear, a gear unit rotatably mounted on said first counter shaft comprising a gear member and a pinion member of reduced diameter meshing with said first gear on said output shaft, a shiftable gear splined on said second counter shaft and having a neutral position between said gear member of said gear unit and said second gear on said output shaft, said shiftable gear being movable in one direction into mesh with said gear member of said unit and in the opposite direction into mesh with said second gear of said output shaft effective for driving the latter in forward and reverse directions respectively by said second counter shaft, and supplementary means for selectively establishing and disestablishing other driving connections between said counter shafts and said output shaft.

4. In a transmission unit, an input shaft, an output shaft coaxial with said input shaft, first and second and third counter shafts parallel with and spaced radially from said output shaft, means providing a constant drive between said input shaft and all of said counter shafts, a first gear keyed on said output shaft, a second gear keyed on said output shaft adjacent said first gear, a gear unit rotatably mounted on said first counter shaft comprising a gear member and a pinion member of reduced diameter meshing with said first gear on said output shaft, a shiftable gear splined on said second counter shaft and having a neutral position between said gear member of said gear unit and said second gear on said output shaft, said shiftable gear being movable in one direction into mesh with said gear member of said unit and in the opposite direction into mesh with said second gear of said output shaft effective for driving the latter in forward and reverse directions respectively by said second counter shaft, and supplementary means for selectively establishing and disestablishing other driving connections between said counter shafts and said output shaft and for optionally clutching said output shaft to said input shaft for direct drive thereby and declutching it from said input shaft.

5. In a transmission unit, an input shaft, an output shaft coaxial with said input shaft, first and second and third counter shafts parallel with and spaced radially from said output shaft, means providing a constant drive between said input shaft and all of said counter shafts, a first gear keyed on said output shaft, a second gear keyed on said output shaft adjacent said first gear, a gear unit rotatably mounted on said first counter shaft comprising a gear member and a pinion member of reduced diameter meshing with said first gear on said output shaft, a shiftable gear splined on said second counter shaft and having a neutral position between said gear member of said gear unit and said second gear on said output shaft, said shiftable gear being movable in one direction into mesh with said gear member of said unit and in the opposite direction into mesh with said second gear of said output shaft effective for driving the latter in forward and reverse directions respectively by said second counter shaft, a third gear keyed on said output shaft remote from said first and second gears thereon, a gear rotatably mounted on said first counter shaft and meshing with said third gear on said output shaft, two gears rotatably mounted on said third counter shaft spaced apart lengthwise thereof and respectively meshing with said first and third gears on said output shaft, clutch means on said first counter shaft between said gear and gear unit thereof and effective for selectively clutching either thereof to said first counter shaft, and clutch means on said third counter shaft between said two gears thereon and effective for selectively clutching either thereof to said third counter shaft.

6. In a transmission unit, an input shaft, an output shaft coaxial wtih said input shaft, first and second and third counter shafts parallel with and spaced radially from said output shaft, means providing a constant drive between said input shaft and all of said counter shafts, a first gear keyed on said output shaft, a second gear keyed on said output shaft adjacent said first gear, a gear unit rotatably mounted on said first counter shaft comprising a gear member and a pinion member of reduced diameter meshing with said first gear on said output shaft, a shiftable gear splined on said second counter shaft and having a neutral position between said gear member of said gear unit and said second gear on said output shaft, said shiftable gear being movable in one direction into mesh with said gear member of said unit and in the opposite direction into mesh with said second gear of said output shaft effective for driving the latter in forward and reverse directions respectively by said second counter shaft, a third gear keyed on said output shaft remote from said first and second gears thereon, a gear rotatably mounted on said first counter shaft and meshing with said third gear on said output shaft, two gears rotatably mounted on said third counter shaft spaced apart lengthwise thereof and respectively meshing with said first and third gears on said output shaft, clutch means on said first counter shaft between said gear and gear unit thereof and effective for selectively clutching either thereof to said first counter shaft, clutch means on said third counter shaft between said two gears thereon and effective for selectively clutching either thereof to said third counter shaft, and clutch means on said output shaft effective for optionally clutching it directly to and declutching it from said input shaft.

References Cited by the Examiner

UNITED STATES PATENTS

| | | | |
|---|---|---|---|
| 2,010,161 | 8/1935 | Robbins | 74—331 |
| 2,511,539 | 6/1950 | Orr | 74—331 |
| 2,633,753 | 4/1953 | Campodonico | 74—331 |

DAVID J. WILLIAMOWSKY, *Primary Examiner.*

H. S. LAYTON, *Assistant Examiner.*